United States Patent [19]

Shimp

[11] 4,205,361
[45] May 27, 1980

[54] UNDERVOLTAGE CONTROL APPARATUS FOR CIRCUIT INTERRUPTER

[75] Inventor: Alan B. Shimp, Monroeville, Pa.

[73] Assignee: Westinghouse Electric Corp., Pittsburgh, Pa.

[21] Appl. No.: 888,725

[22] Filed: Mar. 21, 1978

[51] Int. Cl.² .............................................. H02H 3/24
[52] U.S. Cl. ...................................... 361/92; 361/115; 361/154
[58] Field of Search ...................... 361/92, 18, 86, 90, 361/115, 152, 154, 155, 187; 323/19, 20, 22 R, 22 T, 22 Z

[56] References Cited

U.S. PATENT DOCUMENTS

| 4,011,484 | 3/1977 | Paice et al. | 361/92 X |
| 4,013,926 | 3/1977 | Lang et al. | 361/115 |
| 4,025,823 | 5/1977 | Lang et al. | 361/92 X |
| 4,041,546 | 8/1977 | Stewart | 361/152 |

Primary Examiner—Patrick R. Salce
Attorney, Agent, or Firm—Robert E. Converse, Jr.

[57] ABSTRACT

Apparatus for undervoltage control of a circuit breaker includes a holding coil, a switching transistor connected in series with the holding coil, and a rectifier providing pulsating DC voltage. A level detector responsive to the output voltage of the rectifier produces an actuating signal for the switching transistor when the rectifier output voltage rises above a predetermined value. A switching regulator is provided which is connected to the level detector and the switching transistor for modulating the actuating signal when the voltage to the rectifier input rises above a predetermined value. The switching transistor is thus rendered periodically non-conducting to regulate the average voltage appearing across the holding coil.

7 Claims, 5 Drawing Figures

UNDERVOLTAGE CONTROL APPARATUS FOR CIRCUIT INTERRUPTER

BACKGROUND OF THE INVENTION

Field of the Invention

The invention relates generally to circuit interrupter apparatus and, more particularly, to apparatus providing undervoltage control of an associated circuit interrupter.

Description of the Prior Art

Circuit breakers are widely used in industrial, commercial, and residential applications to provide protection for electrical apparatus and distribution equipment. Upon overcurrent conditions through a connected circuit, the circuit breaker will automatically open to interrupt current flow through the circuit. Certain applications such as in the mining industry require an undervoltage release capability, allowing the circuit breaker contacts to be automatically opened whenever a control voltage falls below a predetermined minimum. This capability is often provided by an electromagnet which restrains a plunger positioned in proximity to a trip mechanism. So long as the electromagnet is energized, the breaker will be maintained in an untripped condition. Upon de-energization of the electromagnet, a bias spring operates the plunger against the trip mechanism to automatically open the circuit breaker contacts.

An undervoltage control for molded case circuit breakers is required to hold in, that is, to refrain from tripping the breaker, when the input control voltage rises above a certain fraction (between 35% and 75%) of its nominal value. The device must be able to withstand at least 110% of nominal voltage continuously, according to Underwriters Laboratories Standard 489. Because of the wide range of input control voltage, these devices are subject to problems such as marginal hold-in capability at low voltage and excessive heat dissipation by the electromagnet coil at high voltage. To overcome these problems, series transistor regulators have been used to supply constant current to the coils. This type of regulator requires power to be dissipated in a transistor which must be mounted on a relatively large and expensive heat sink. Also the extra power dissipated inside the circuit breaker housing is undesirable. Switching regulators, which dissipate negligible amounts of power, have not been used because of the complexity of the required control circuitry.

It would therefore be desirable to provide undervoltage control apparatus for a circuit breaker which combines the relatively low cost and simplicity of the series transistor regulator with the low power dissipation of a switching regulator.

SUMMARY OF THE INVENTION

Apparatus for undervoltage control of a circuit interrupter employs a holding coil and an electronic switch having its output connected in series with the holding coil and the output of a rectifier, the input of the rectifier being connected to alternating current control lines. A level detector is provided which is responsive to the output voltage of the rectifier to produce an activating signal for the electronic switch when the rectifier output voltage rises above a first predetermined value and which removes the activating signal when the rectifier output voltage falls below a second predetermined value. A switching regulator is connected to the level detector and the electronic switch to modulate the activating signal when the voltage on the alternating current control lines rises above a predetermined value. The electronic switch is thus rendered periodically non-conducting to regulating the average voltage appearing across the holding coil. The average voltage across the coil remains substantially constant in the presence of the widely varying input control voltage.

DESCRIPTION OF THE PREFERRED EMBODIMENT

Figure 1:
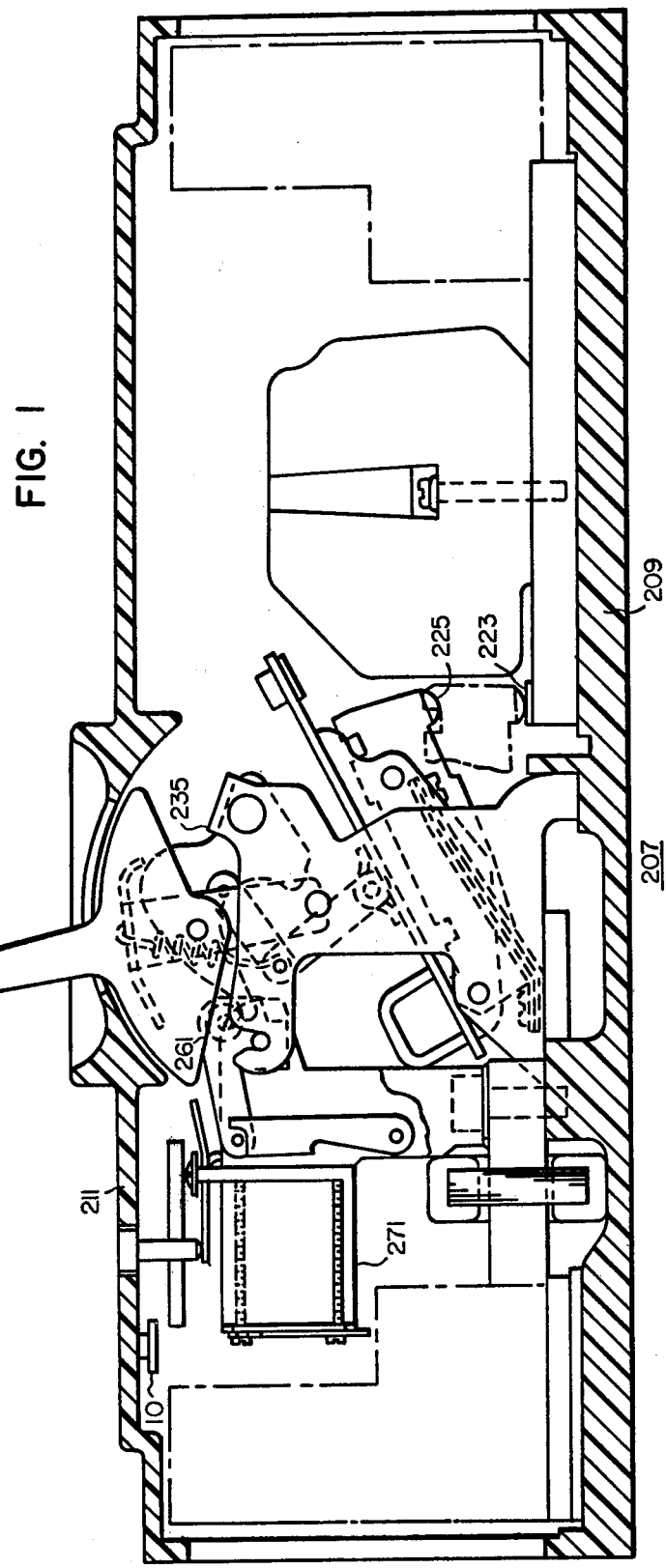
FIG. 1 is a vertical sectional view, with parts broken away, of a circuit breaker employing the principles of the present invention.

Referring now to the drawings, in which corresponding reference characters refer to corresponding components, FIG. 1 shows a circuit breaker 207 employing the principles of the present invention. The circuit breaker 207 includes an insulating base 209 in a housing 211. Enclosed within the base 209 and housing 211 are an operating mechanism 235 including separable contacts 223 and 225, a trip mechanism 261, an undervoltage release mechanism 271 including a holding coil 24 (not shown in FIG. 1), and a control device 10. The operating mechanism 235, trip mechanism 261, and undervoltage release mechanism 271 are more completely described in U.S. Pat. No. 4,013,926 issued Mar. 22, 1977 to Walter W. Lang et al. Thus, these components will be only briefly described herein.

Manual operation of the handle 249 causes the operating mechanism 235 to open or close the contacts 223, 225. With the contacts 223, 225 in the closed position, actuation of the trip mechanism 261 will cause the contacts to automatically separate. This actuation can be effected by either an overcurrent condition through the contacts or an undervoltage condition on alternating current control lines L1 and L2 connected to the control device 10, which actuates the undervoltage release mechanism 271.

Figure 2:
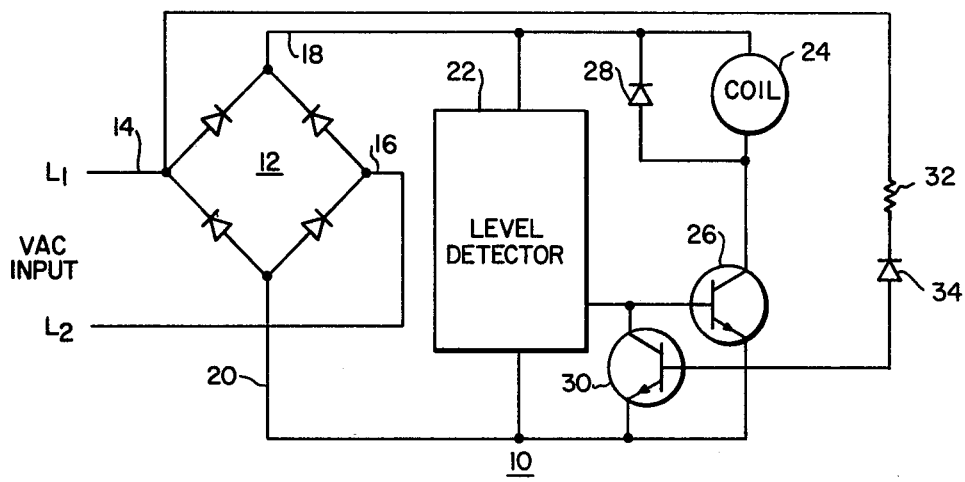
FIG. 2 is a schematic circuit diagram of an undervoltage control device for use with the breaker of FIG. 1.
Figure 3:
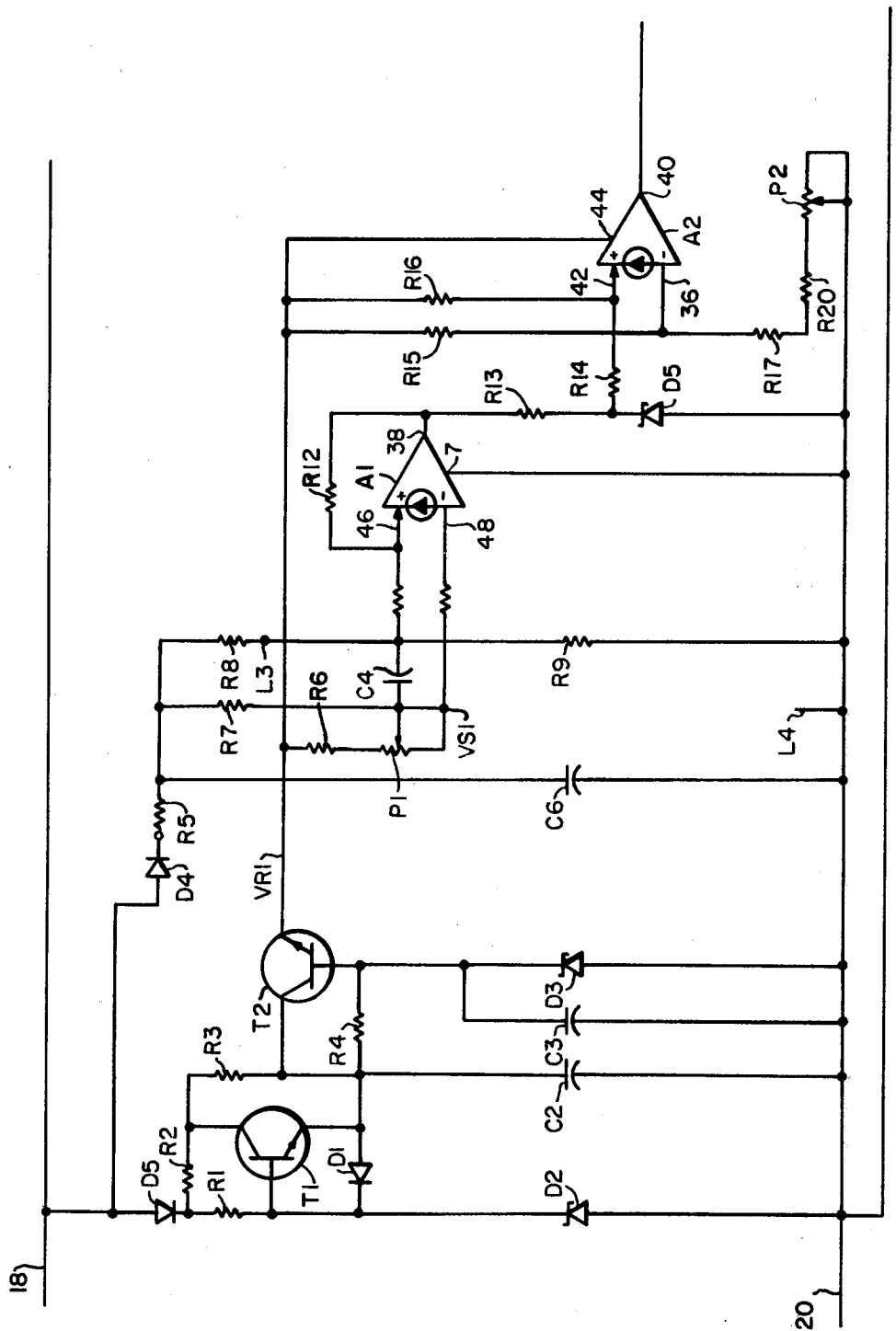
FIG. 3 is a detailed schematic diagram of a level detector which can be used with the undervoltage control device of FIG. 2.

In FIG. 2 there is shown a schematic diagram of the undervoltage control device 10. The alternating control lines L1 and L2 are connected to a bridge rectifier 12 at input terminals 14 and 16. A holding coil 24 is connected in series with a switching transistor 26 across the output terminals 18 and 20 of the bridge rectifier 12. A level detector 22 is also connected across the rectifier output terminals 18 and 20. The level detector 22, shown in detail in FIG. 3, is responsive to the output voltage at rectifier output terminals 18 and 20 to produce an actuating signal upon the base of the transistor Q1 whenever the rectifier output voltage rises above a predetermined level. The actuating signal renders the switching transistor Q1 conductive, thus energizing the coil 24 to prevent the trip mechanism 261 from releasing to separate the breaker contacts 223, 225. A freewheeling diode 28 is connected across the coil 24 to minimize the ripple in the direct current flowing in the coil 24.

A switching regulator composed of transistor 30, resistor 32, and zener diode 34 is responsive to the voltage upon the control lines L1-L2. The transistor 30 connected to the base of switching transistor 26 acts to modulate the actuating signal applied by the level detector 22 to periodically shunt the actuating signal.

The level detector 22 has a zero output as long as the voltage upon the terminals 18 and 20 remains below a predetermined level corresponding to, for example, 50% of nominal input voltage on lines L1 and L2. When the voltage at terminals 18 and 20 rises above this level, the level detector 22 produces an actuating signal sufficient to render the switching transistor 26 fully conductive. Since the switching transistor 26 is either fully on or fully off, it has a very small power dissipation and no heat sink is required.

When the voltage at terminals 18 and 20 rises slightly above the pickup point of the level detector 22, transistor 26 is turned on continuously, and full line voltage is applied to the coil 24. At somewhat higher input voltages, the breakdown voltage of zener diode 34 is exceeded near the peak of the input voltage waveform. When zener diode 34 conducts, it renders transistor 30 conductive. This shunts the input signal from the base of the transistor 26 causing it to turn off for a short period of time. As a result, voltage is applied to the coil 24 for decreasing amounts of time as the line voltage is raised.

Figure 4:
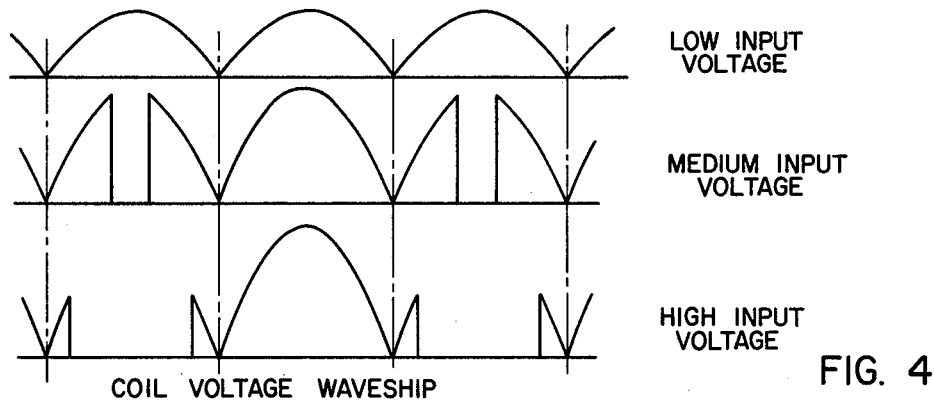
FIG. 4 is a graph of instantaneous coil voltage vs. AC line voltage.

Typical waveshapes of voltage upon the coil 24 of voltage are shown in FIG. 4. Note that because of the connection of zener diode D1 to the conductor L1 of the alternating current control line, transistor 26 is rendered non-conductive for only portions of every other half cycle. The rendering of transistor 26 non-conductive on alternate half cycles is an important feature of the present invention, because it causes approximately constant average voltage to be applied to the coil for widely varying input voltages upon the lines L1 and L2.

By proper choice of the zener voltage of the zener diode 34, the average coil voltage is held relatively constant over a wide range of input voltages. Note that if the circuit were such that transistor 26 were turned off every half cycle instead of every other half cycle, the average coil voltage would decrease rapidly as input voltage increased. This is of course undesirable since the object is to keep the average coil voltage as nearly constant as possible.

As can be seen, a low input voltage results in a full pulsating DC voltage being applied to the coil 24. At slightly higher input voltages, the transistor 30 is periodically energized near the peak of the waveform of every other half cycle to render switching transistor 26 non-conductive near the peak of the voltage waveform on alternate half cycle. At yet higher input voltages, the transistor 30 is conductive over a greater portion of the voltage waveform, thus de-energizing the switching transistor 26 for a greater duration of time on alternate half cycles.

Figure 5:
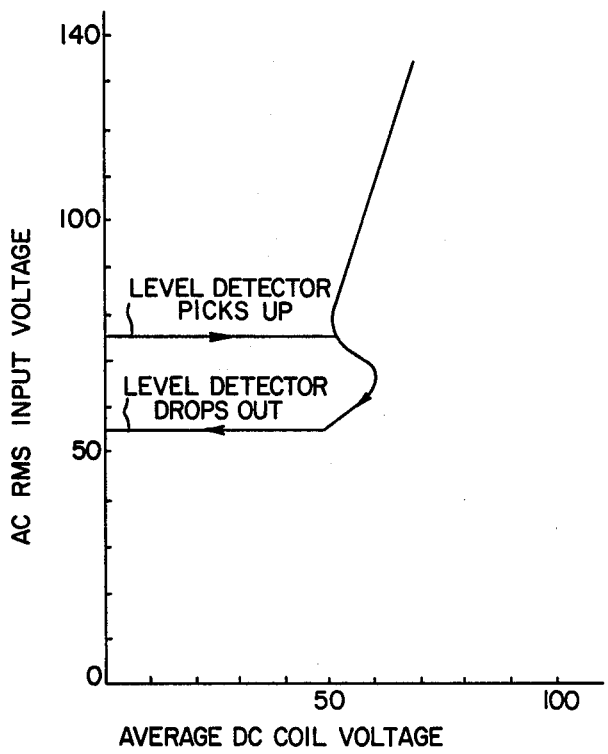
FIG. 5 is a graph of average coil voltage vs. AC line voltage.

FIG. 5 is a graph showing average voltage upon the coil 24 for various RMS input voltages across the lines L1, L2. As can be seen, the voltage across the coil 24 is zero until the input voltage rises to approximately 75 volts and the average coil voltage at this time is approximately 50 volts. As the RMS input voltage rises from 75 volts to approximately 135 volts, the average coil voltage rises at a lower rate to only about 70 volts. As the RMS input voltage across the lines L1 and L2 drops, the coil voltage drops back to about 50 volts and then rises slightly to a peak of about 60 volts. Further decrease in the RMS input voltage on the lines L1 and L2 results in the level detector dropping out at approximately 55 volts causing the average coil voltage to drop from about 50 volts to zero.

Various types of level detectors are well known in the art, and the construction of the level detector is not a part of the present invention. A suitable level detector is shown in FIG. 3 and is described more completely in U.S. Pat. No. 4,025,823 issued May 24, 1977 to Walter W. Lang. When the voltage at the output terminals 18 and 20 rises above a predetermined level such as 75 volts, an actuating signal is supplied by operational amplifier A2 at the terminal 40.

It can be seen that the present invention provides an undervoltage control device for a circuit interrupter which exhibits a number of advantages. A relatively constant average voltage is applied to the hold-in coil (and a relatively constant current flows therethrough) for widely varying input voltages. The power dissipated by the coil and inside the breaker is minimized. In addition, only three small relatively inexpensive components are required to implement the control. Furthermore, no heat sink is required for the switching transistor 26. It can be seen therefore that the present invention provides an undervoltage control apparatus for circuit breakers which exhibits increased performance over the prior art.

I claim:

1. Circuit interrupter undervoltage control apparatus, comprising;
   a holding coil;
   an electronic switch having an output connected in series with said holding coil;
   a rectifier having an input connected to alternating current control lines, and an output connected in series with said holding coil and said electronic switch;
   a level detector responsive to the output voltage of said rectifier for supplying an activating signal to said electronic switch when said rectifier output voltage rises above a first predetermined value, and removing said activating signal when said rectifier output voltage falls below a second predetermined value; and
   a switching regulator connected to said level detector, said electronic switch, and said rectifier input for modulating said actuating signal when the voltage on said alternating current control lines rises above a predetermined level, whereby said electronic switch is rendered periodically non-conducting to regulate the average voltage appearing across said holding coil.

2. Apparatus as recited in claim 1 wherein said electronic switch comprises a switching transistor.

3. Apparatus as recited in claim 2 wherein said rectifier comprises a full wave rectifier.

4. Apparatus as recited in claim 3 wherein said switching regulator periodically disables said actuating signal when said rectifier output voltage is above said first predetermined value.

5. Apparatus as recited in claim 4 wherein said switching regulator disables said actuating signal on alternate half cycles of the alternating current input voltage.

6. Apparatus as recited in claim 5 wherein said switching regulator comprises an active electronic device connected across the input of said switching transistor, a zener diode, and means connecting said active electronic device and said zener diode to the input of said rectifier.

7. Apparatus as recited in claim 6 wherein said switching regulator comprises a regulating transistor having its output across the input of said switching transistor and its input connected in series with said zener to the input of said rectifier.

* * * * *